(12) United States Patent
Stieff et al.

(10) Patent No.: US 7,810,244 B2
(45) Date of Patent: Oct. 12, 2010

(54) VEHICLE WHEEL OPTICAL TARGET MOUNTING ASSEMBLY

(75) Inventors: Michael T. Stieff, Wentzville, MO (US);
Gregory F. Meyer, St. Louis, MO (US);
Dennis M. Linson, St. Charles, MO (US)

(73) Assignee: Hunter Engineering Company, Bridgeton, MO (US)

( * ) Notice: Subject to any disclaimer, the term of this patent is extended or adjusted under 35 U.S.C. 154(b) by 118 days.

(21) Appl. No.: 12/120,460

(22) Filed: May 14, 2008

(65) Prior Publication Data

US 2008/0209744 A1 Sep. 4, 2008

Related U.S. Application Data

(63) Continuation-in-part of application No. 11/535,881, filed on Sep. 27, 2006, now Pat. No. 7,444,752.

(60) Provisional application No. 60/938,947, filed on May 18, 2007, provisional application No. 60/721,206, filed on Sep. 28, 2005.

(51) Int. Cl.
*G01B 11/275* (2006.01)
*G01B 5/255* (2006.01)

(52) U.S. Cl. .................... 33/203.18; 33/288

(58) Field of Classification Search ............ 33/203, 33/203.18, 203.19, 203.2, 288; 356/139.09, 356/155

See application file for complete search history.

(56) References Cited

U.S. PATENT DOCUMENTS

| | | | |
|---|---|---|---|
| 2,552,116 A * | 5/1951 | Rodeghiero | 356/122 |
| 3,409,991 A | 11/1968 | Davis, et al. | |
| 3,805,399 A | 4/1974 | Price | |
| 4,172,326 A * | 10/1979 | Henter | 33/288 |
| 4,377,038 A * | 3/1983 | Ragan | 33/203.18 |

(Continued)

FOREIGN PATENT DOCUMENTS

DE 10-2006-035534 A1 1/2008

(Continued)

OTHER PUBLICATIONS

Hunter Engineering Company, Form 5007T, Self-Centering Wheel Adapters for Hunter DSP600 and DSP500 Wheel Alignment Sensors, Aug. 2005, 2 pages.

(Continued)

*Primary Examiner*—R. A. Smith
(74) *Attorney, Agent, or Firm*—Polster, Lieder, Woodruff & Lucchesi, L.C.

(57) ABSTRACT

A machine vision vehicle wheel alignment system optical target assembly which incorporates an adaptor for attachment of an optical target to a vehicle wheel assembly. The adaptor includes a circular sinusoidal edge for seating in a non-determined position against surfaces of a vehicle wheel assembly, and a pair of pivoting arm assemblies capable of independent movement which are configured to position tire hooks for gripping the tread surfaces of a tire mounted to the wheel rim. Forces exerted between the pivoting arms are transferred to the tire hooks to hold the optical target assembly in contact with the wheel assembly surface. The optical target is integrated into the adaptor, and maintained in a stationary relationship to the wheel assembly thereby during a vehicle wheel alignment procedure.

28 Claims, 8 Drawing Sheets

U.S. PATENT DOCUMENTS

| | | | |
|---|---|---|---|
| 4,433,489 A * | 2/1984 | Boyce | 33/203.18 |
| 4,573,275 A | 3/1986 | Bremer | |
| 5,048,192 A | 9/1991 | Pascoal | |
| 5,724,128 A | 3/1998 | January | |
| 5,886,781 A | 3/1999 | Muller et al. | |
| 5,987,761 A | 11/1999 | Ohnesorge | |
| 6,064,750 A * | 5/2000 | January et al. | 382/103 |
| 6,131,293 A | 10/2000 | Maioli et al. | |
| 6,134,792 A * | 10/2000 | January | 33/203.18 |
| 6,148,528 A | 11/2000 | Jackson | |
| 6,526,665 B2 | 3/2003 | Jackson | |
| 6,894,771 B1 * | 5/2005 | Dorrance et al. | 356/139.09 |
| 7,444,752 B2 * | 11/2008 | Stieff et al. | 33/203.18 |
| 2008/0222903 A1 * | 9/2008 | Abke | 33/203.18 |

FOREIGN PATENT DOCUMENTS

| | | | |
|---|---|---|---|
| EP | 1231451 A1 * | 8/2002 | |
| FR | 2824391 A3 * | 11/2002 | |
| GB | 2176618 A * | 12/1986 | |
| WO | 00/33018 A1 | 6/2000 | |

OTHER PUBLICATIONS

Hunter Engineering Company, Form 5235T, HTA-MB Wheel Alignment Systems Customized for Aligning All Mercedes-Benz Vehicles, Feb. 2005, 8 pages.

* cited by examiner

VEHICLE WHEEL OPTICAL TARGET MOUNTING ASSEMBLY

CROSS-REFERENCE TO RELATED APPLICATIONS

The present application is related to, and claims priority from U.S. Provisional Patent Application Ser. No. 60/938,947 filed on May 18, 2007, which is herein incorporated by reference. The present application is further a continuation-in-part of co-pending U.S. patent application Ser. No. 11/535,881 filed on Sep. 27, 2006 which is related to, and claims priority from, U.S. Provisional Patent Application Ser. No. 60/721,206 filed on Sep. 28, 2005, both of which are herein incorporated by reference.

STATEMENT REGARDING FEDERALLY SPONSORED RESEARCH

Not Applicable.

BACKGROUND OF THE INVENTION

The present invention relates to machine vision vehicle service systems, and in particular to an optical target assembly configured for mounting to a surface of a vehicle, such as a vehicle wheel, during a machine-vision vehicle wheel alignment procedure.

A machine-vision vehicle service system, such as a vehicle wheel alignment system like the Series 811 Wheel Alignment System utilizing the DSP 600 Series sensors, manufactured and sold by Hunter Engineering Company of Bridgeton, Mo., consists generally of a console having a computer or processing unit, one or more display devices such as a monitor, and one or more input devices such as a keyboard. In a machine-vision vehicle wheel alignment system, one or more imaging sensor arrays are mounted away from a vehicle undergoing an alignment inspection, and are configured to obtain images of alignment targets or other identifiable features associated with the vehicle for communication to the processing unit. Correspondingly, the processing unit is configured with one or more software applications, at least one of which is adapted to facilitate the alignment of vehicle wheels which generally consist of a rim and an associated tire, using input received from the imaging sensors.

The machine-vision imaging sensors are traditionally part of a camera system or imaging system configured to view optical targets within associated fields of view to obtain images thereof for processing by the software applications in the console. Commonly, the observed optical targets incorporate highly accurate patterns that have known control features. The positions and relationships of the features in the images are determined, and the orientation of the wheels or other vehicle components to which the optical targets are attached are calculated by well known algorithms. Exemplary configurations for the high-accuracy optical targets are described in U.S. Pat. No. 6,064,750 to January, and in U.S. Pat. No. 6,134,792 to January. Each optical target consists of a target face, on which are disposed identifiable optical elements, a precision flat base, and a mounting shaft adapted for attachment to a separate clamping assembly secured to the vehicle or vehicle wheel assembly.

The conventional configuration for an optical target is precisely engineered with high-contrast optical elements such as circles, squares, or triangles. The accuracy of such conventionally configured optical targets is dependant upon how well the high contrast edges of the optical target elements can be located in an image produced by the imaging components of the wheel alignment system. For the best accuracy, the individual optical elements must be large enough to have relatively long straight or curved boundaries, and they must be separated far enough to prevent the individual optical target elements from appearing to fuse into a single object when reduced edge sharpness causes two or more optical target elements to bleed into the same pixel in the imaging system. These factors combine to limit the number of individual image pixels generated by the imaging system whose values are utilized to calculate a position and orientation of a conventionally configured optical target.

Each image of conventional high-contrast optical target acquired by the optical imaging vehicle wheel alignment system is processed to identify a number of reference points in the image. Either the computer or the imaging system is configured to mathematically manipulate the positional relationships of the observed reference points, as identified in an image, to match them with a set of predetermined positional relationships based on the known parameters of the conventional high-contrast optical target. Once the relationship between the observed positional relationships and the predetermined positional relationships is identified for the reference points, the position and orientation in three-dimensional space of the target (and an associated vehicle wheel) relative to the position and orientation of the imaging system is identified, from which one or more vehicle wheel alignment angles can be identified. Accordingly, for an optical imaging vehicle wheel alignment system to function, it is necessary for the system to be capable of extracting a set of control or reference points from acquired images.

To further facilitate the operation of a machine vision vehicle wheel alignment system, the separate optical targets are secured to the vehicle wheels with precision wheel adaptors configured to clamp onto the vehicle wheel edges and to position a mounting point for the optical target substantially coaxial with the wheel rim's axis of rotation. The traditional precision wheel adaptors typically include a set of claws or feet adapted to secure the wheel adaptor to the vehicle wheel assembly by engaging the lip or rim of the wheel rim at the tire junction. A centering mechanism on the wheel adaptor ensures that the claws or feet of the wheel adaptor are adjusted in a symmetrical manner to maintain the mounting point for the optical target in a determined centered configuration in relation to the axial center of the wheel rim.

Some variations of traditional wheel adaptors, such as the Tire Clamp Adaptor Model No. 20-1789-1 from Hunter Engineering Co., and those shown in U.S. Pat. No. 5,987,761 to Ohnesorge and U.S. Pat. No. 6,131,293 to Maioli et al. further utilize a set of gripping arms adapted to engage tire surfaces in conjunction with a set of contact supports and centering mechanisms for symmetrically engaging the circumferential lip of the wheel rim and securing the wheel adaptors in an axially centered position on the vehicle wheel assembly.

Other vehicle-specific wheel adaptors, such as those for use with Mercedes Benz and BMW automobiles, are configured with a set of pins which are designed to pass through the wheel assembly, and to contact predetermined surfaces on the vehicle wheel hubs, positioning the vehicle-specific wheel adaptor in a predetermined axially centered location about the wheel assembly. These vehicle specific wheel adaptors are then held in place by means of tire clamps or spring mechanisms which grip to the tire tread surfaces.

Traditional wheel adaptors that will universally adapt to the wide range of wheel sizes on the market today are difficult to design and costly to build. Many times additional parts are required, such as extenders, in order to allow the adaptor to work with wheels that are very small or very large which also adds additional cost and complication to the adaptor system. Additionally, traditional adaptors have to provide a substantial amount of clamping force in order to hold the weight of the target or sensor on the wheel assembly. This clamping force can scratch or dent the wheel assembly where it is attached. This is very undesirable especially when the wheel assembly is a very costly aftermarket wheel.

Accordingly, it would be advantageous to provide a machine vision vehicle service system, such as a wheel alignment system, with an optical target assembly which incorporates both the optical target and a simplified adaptor for attachment to a vehicle wheel, and which does not require a determined precision mounting on the vehicle wheel assembly in relation to the wheel axis of rotation.

It would be further advantageous to provide a machine vision vehicle wheel alignment system with a mechanically simplified optical target assembly which is light weight, dimensionally stable, less abrasive to the wheel rim surfaces, and which does not require precision construction.

BRIEF SUMMARY OF THE INVENTION

Briefly stated, the present invention provides a machine vision vehicle wheel alignment system optical target assembly which incorporates an adaptor for attachment of an optical target to a vehicle wheel assembly. The adaptor includes a circular and generally sinusoidal edge for seating in a non-determined position against surfaces of a vehicle wheel assembly, and a pair of pivoting arm assemblies capable of independent movement which are configured to position tire hooks for gripping the tread surfaces of a tire mounted to the wheel rim. Forces exerted between the pivoting arms are transferred to the tire hooks to hold the optical target assembly in contact with the wheel assembly surface. The optical target is integrated into the adaptor, and maintained in a stationary relationship to the wheel assembly thereby during a vehicle wheel alignment procedure.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
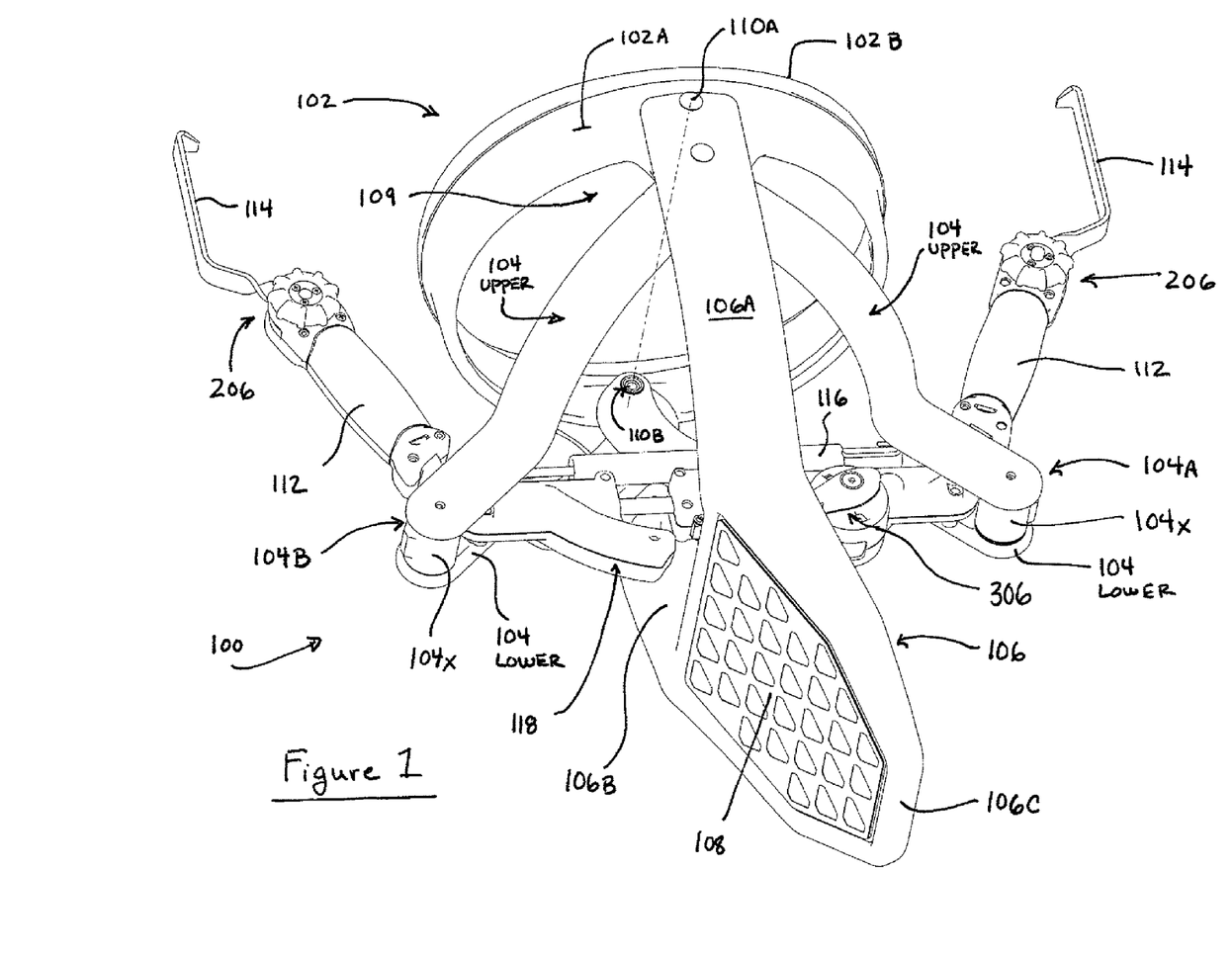
FIG. 1 is a perspective view of a vehicle wheel optical target mounting assembly of the present disclosure.
Figure 2:
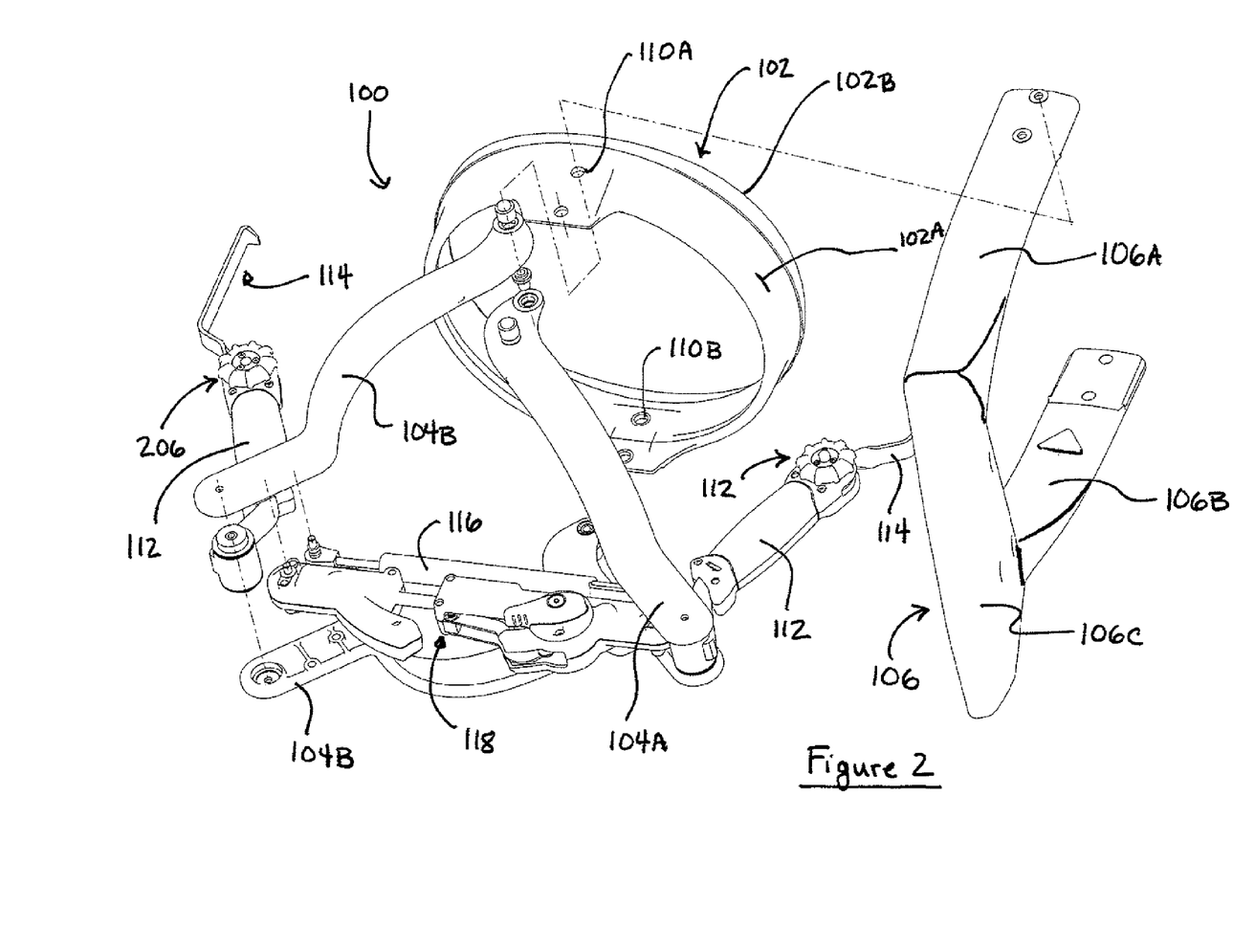
FIG. 2 is an exploded view of the optical target mounting assembly of FIG. 1.

Turning to FIG. 1, an embodiment of the optical target assembly 100 of the present invention is shown in a perspective view. The optical target assembly 100 consists of a base assembly 102, a pair of pivot arm assemblies 104A and 104B pivotally coupled to the base assembly 102, a target support assembly 106 rigidly coupled to the base assembly 102, and an optical target 108 integrated into the target support assembly 106. Those of ordinary skill will recognize that the base 102 may be of unitary construction or of any other suitable configuration.

The optical target 108 provides visible features which are identifiable in images acquired by an imaging system associated with a vehicle service device, and which provide a sufficient number of data points to enable a determination as to the position and orientation of the optical target 108 in three-dimensional space from acquired images. For example, the optical target 108 may include a set of geometric figures arranged in a predetermined configuration as shown in U.S. Pat. No. 6,134,792 to January, herein incorporated by reference, or simply a set of identifiable fixed features, such as shown in U.S. Pat. No. 6,894,771 to Dorrance et al., herein incorporated by reference. The visible features (data points) of the optical target 108 need not be disposed on a planar surface, but rather, may be disposed on any dimensionally stable surface or shape, including non-planar surfaces, smoothly curved surfaces, or angled surfaces.

It is less costly to manufacture a target where the identifiable fixed features are not precisely known. U.S. Pat. No. 6,894,771 to Dorrance et al. describes an optimization method that may be employed to precisely determine the location of the features by acquiring multiple images of the target while it is rotated. This method could be used on every alignment that is performed when the vehicle is rolled on the runway surface to determine the axis of rotation, or the method may be performed once as a target calibration procedure where the location of the features are stored and later used via methods outlined by U.S. Pat. No. 6,134,792 to January.

Figure 10:
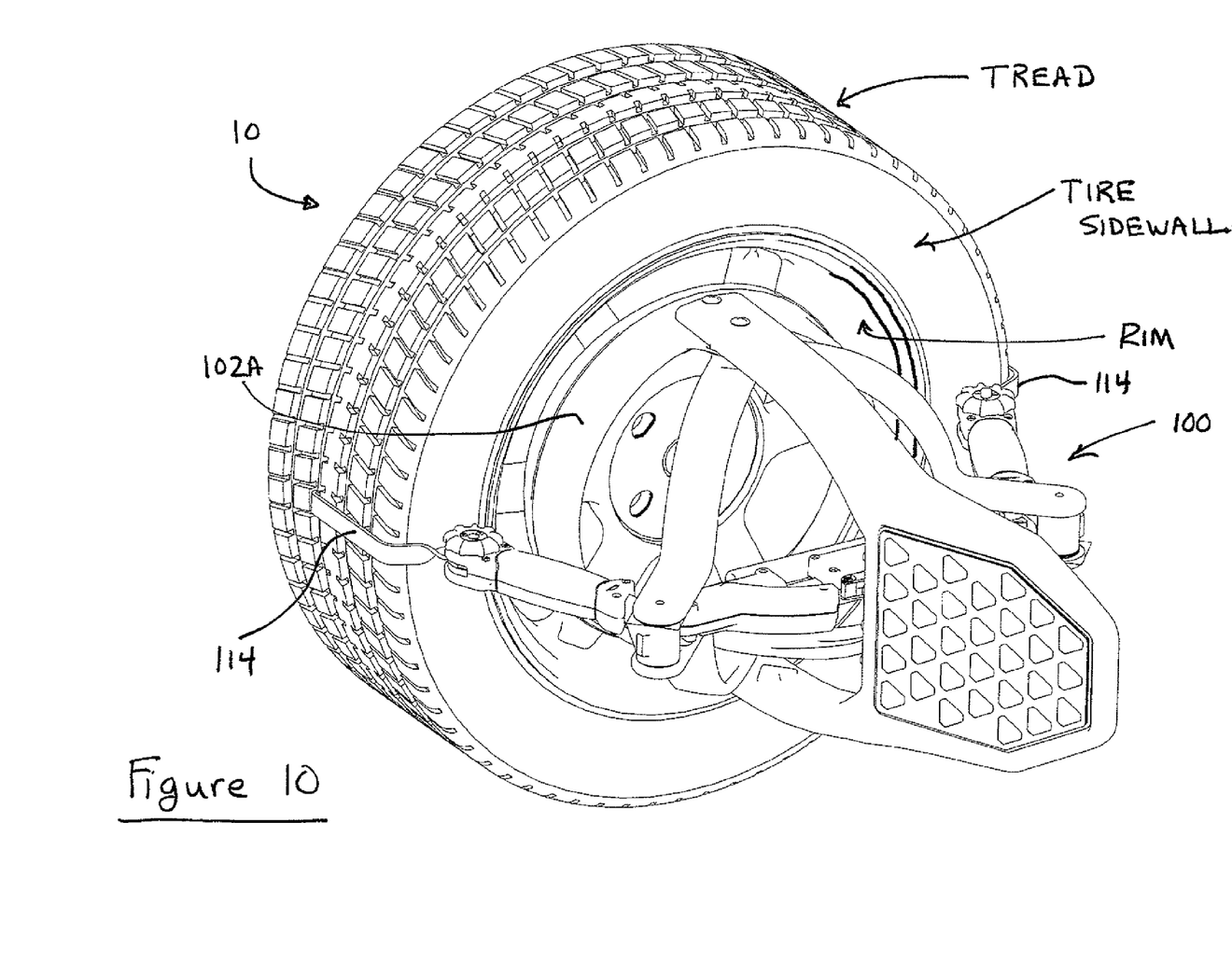
FIG. 10 is a perspective view of the optical target mounting assembly of FIG. 1 secured to a vehicle wheel assembly.

The unitary base assembly 102 is generally defined by a short tubular segment or annular member 102A, having a distal end surface 102B. The distal end surface 102B preferably undulates smoothly and continuously in a generally sinusoidal form to define at least three spaced shallow "peaks" and at least shallow three "valleys", with an average between the peaks and valleys defining an average base plane. Preferably, a whole number multiple of the wavelength of the generally sinusoidal form is equal to the circumferential distance about the distal end surface 102B. The distal end surface 102B is adapted for abutting contact with the generally vertical outer surfaces of a vehicle wheel assembly, such as the tire sidewall, or the vehicle wheel rim between the outer circumferential lip of the wheel rim and the wheel assembly axis of rotation. In one embodiment, the distal end surface is configured as a low-amplitude sinusoid, having a wavelength which equals the circumference of the unitary base assembly 102. Alternatively, those of ordinary skill in the art will recognize that the distal end surface 102B may be configured in any of a variety of non-planar configurations which provide at least three contact points for abutting contact with the surfaces of a vehicle wheel rim. The distal end surface 102B may be either continuous or non-continuous. The configuration of the distal end surface 102B enables the unitary base 102 to contact a vehicle wheel rim at multiple points which are not required to be co-planar, providing for a stable placement of the optical target assembly 100 against the vehicle wheel rim, as seen in FIG. 10. The tubular segment 102 further defines a central opening 109 which facilitates placement about an axial hub-end portion of the vehicle wheel rim 10. Since the assembly 102 of the present invention is intended for a non-determined placement against a wheel assembly surface, the unitary base assembly 102 does not include any adjustment mechanisms for centered positioning relative to either the wheel rim circumferential lip or axis of rotation, such as those commonly found in self-centering or adjustable wheel adaptors.

The target support assembly 106 consists of a pair of support arms 106A and 106B, which are rigidly secured to the base assembly 102 at diametrically opposite fixed positions, and which jointly support a target housing 106C. The optical target 108 is disposed in within the target housing 106C, and is held rigidly in a position which is generally perpendicular to an average base plane defined by the unitary base assembly 102.

To hold the distal end surface 102B in engagement with a generally vertical surface of a vehicle wheel rim 10, such as shown in FIG. 10, the pivot arm assemblies 104A and 104B are pivotally coupled to the unitary base assembly 102 and, through additional components, to the vehicle wheel tire tread. Each pivot arm assembly 104 includes an upper pivot arm 104U and a lower pivot arm 104L, which are each coupled to the unitary base assembly 102 at shared diametrically opposed pivot points 110A and 110B, adjacent the distal end surface 102B. The pivot points 110A and 110B define a generally vertical axis of rotation about which each pivot arm assembly 104A, 104B may rotate. The upper and lower pivot arms 104U and 104L each meet at an apex 104X which further supports a pivoting tire hook handle assembly 112, having an adjustable-position tire hook 114 for engagement with a tire tread surface.

Each tire hook 114 is configured to grip a tire tread surface of a vehicle wheel assembly 10, such as shown in FIG. 10. The tire hooks 114 are preferably constructed from a rigid material, such as steel, and may be coated with plastic, rubber, or any other suitable protective layering to prevent accidental damage to vehicle body surfaces which may be contacted during use. To facilitate engagement of the tire hooks 114 with vehicle wheel assemblies of different sizes, the position of each of the opposed pivot arm assemblies 104A and 104B is adjustable, in concert with the tire hook handle assemblies 112, to accommodate wheel assemblies of different dimensions. A resilient tension and engagement clamping force is applied between the opposed pivot arm assemblies 104A and 104B by a tension spring 116 and a clamping force mechanism 118, each of which are coupled between the apices of the opposed pivot arm assemblies 104A and 104B. The tension spring 116 maintains the pivot arm assemblies 104A and 104B in a stored position during non-use, during which they are aligned at approximately a 45 degree angle relative to the base assembly 102. During use, each pivot arm assembly 104A and 104B may be pivoted independently about the axis connecting pivot points 110A and 110B, between the rest position and the base assembly 102, such that the apices of each pivot arm assembly 104A and 104B move through arcs in a plane which is generally parallel to the surface upon which the vehicle wheel assembly rests.

Figures 3, 4:
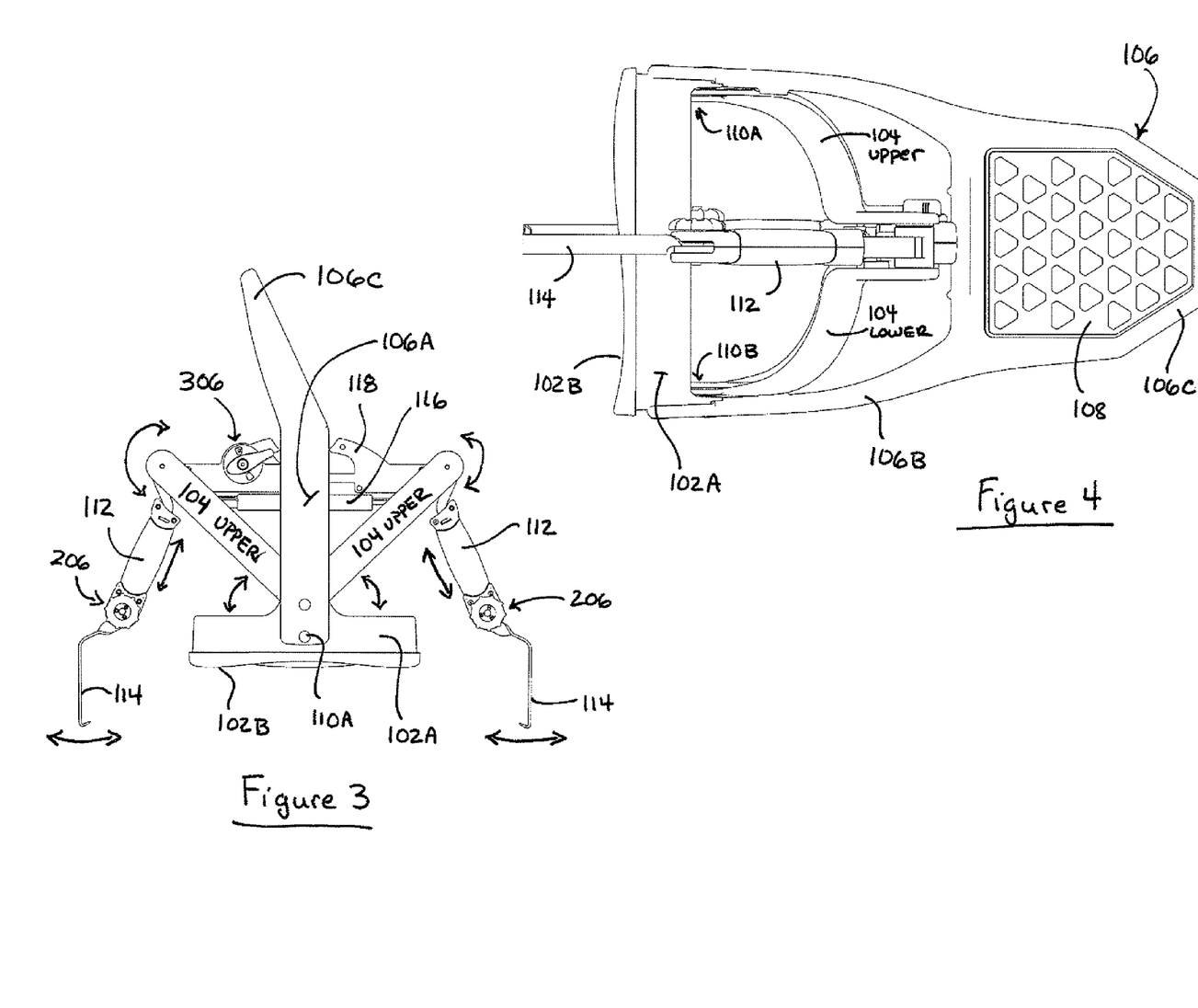
FIG. 3 is a top plan view of the optical target mounting assembly of FIG. 1.
FIG. 4 is a front plan view of the optical target mounting assembly of FIG. 1.
Figure 5:
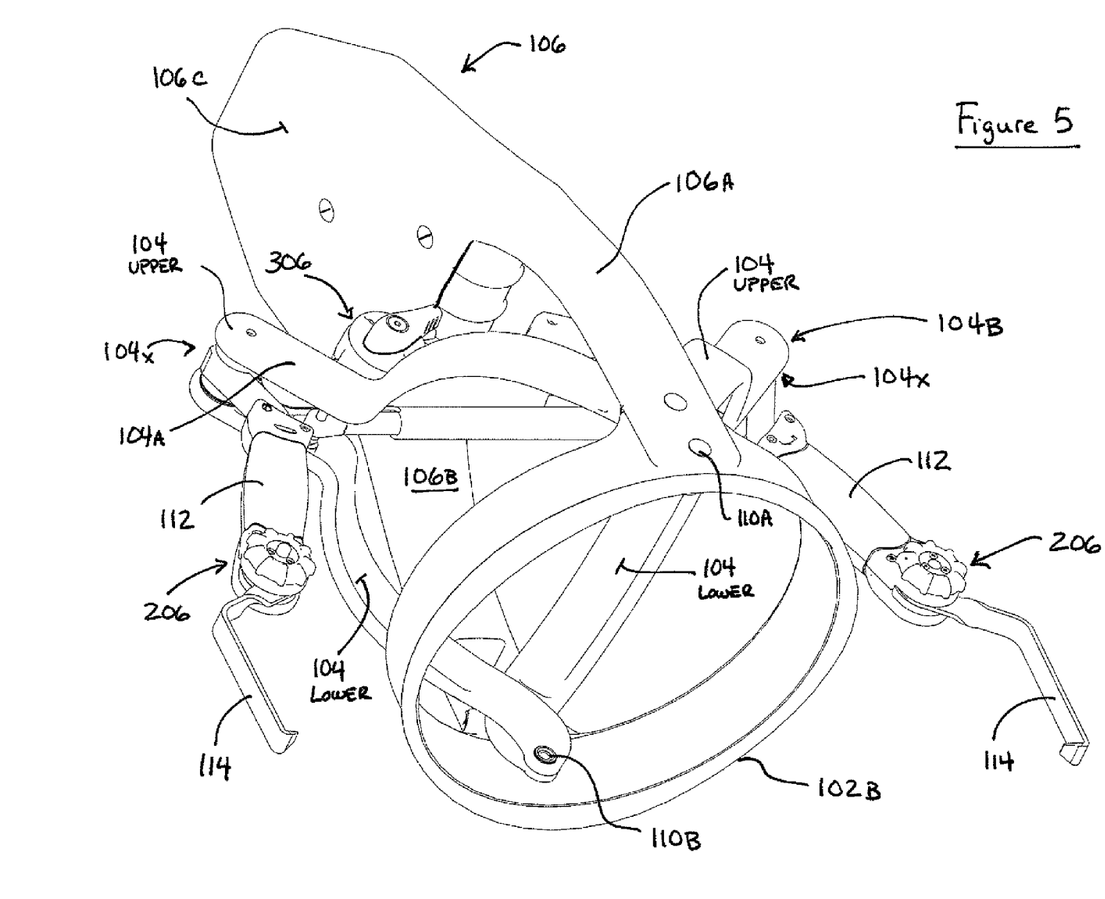
FIG. 5 is a rear perspective view of the optical target mounting assembly of FIG. 1.

To engage each tire hook 114 with a tire tread surface, such as shown in FIG. 10, the distal end surface 102B of the unitary base 102 is seated against the generally vertical vehicle wheel rim surface, and the pivot arm assemblies 104A and 104B are pivoted inward towards the vehicle wheel rim assembly. Simultaneously, as best seen in FIG. 3, the tire hook handle assemblies 112 are rotated about their respective pivot points at each apex 104X, and extended longitudinally as required, to bring the tire hooks 114 into substantially parallel engagement with the tire tread surfaces. Once the tire hooks are each engaged with the tire tread surfaces on substantially opposite sides of the vehicle wheel assembly, the tension force exerted between each of the pivot arm assemblies 104A and 104B by the tension spring 116 will temporarily maintain the optical target assembly 100 in place against the vehicle wheel surface until a clamping force is applied by the clamping force mechanism 118 as is described below. Removal of the optical target assembly 100 from a vehicle wheel assembly is merely the reverse of the installation.

Figure 6:
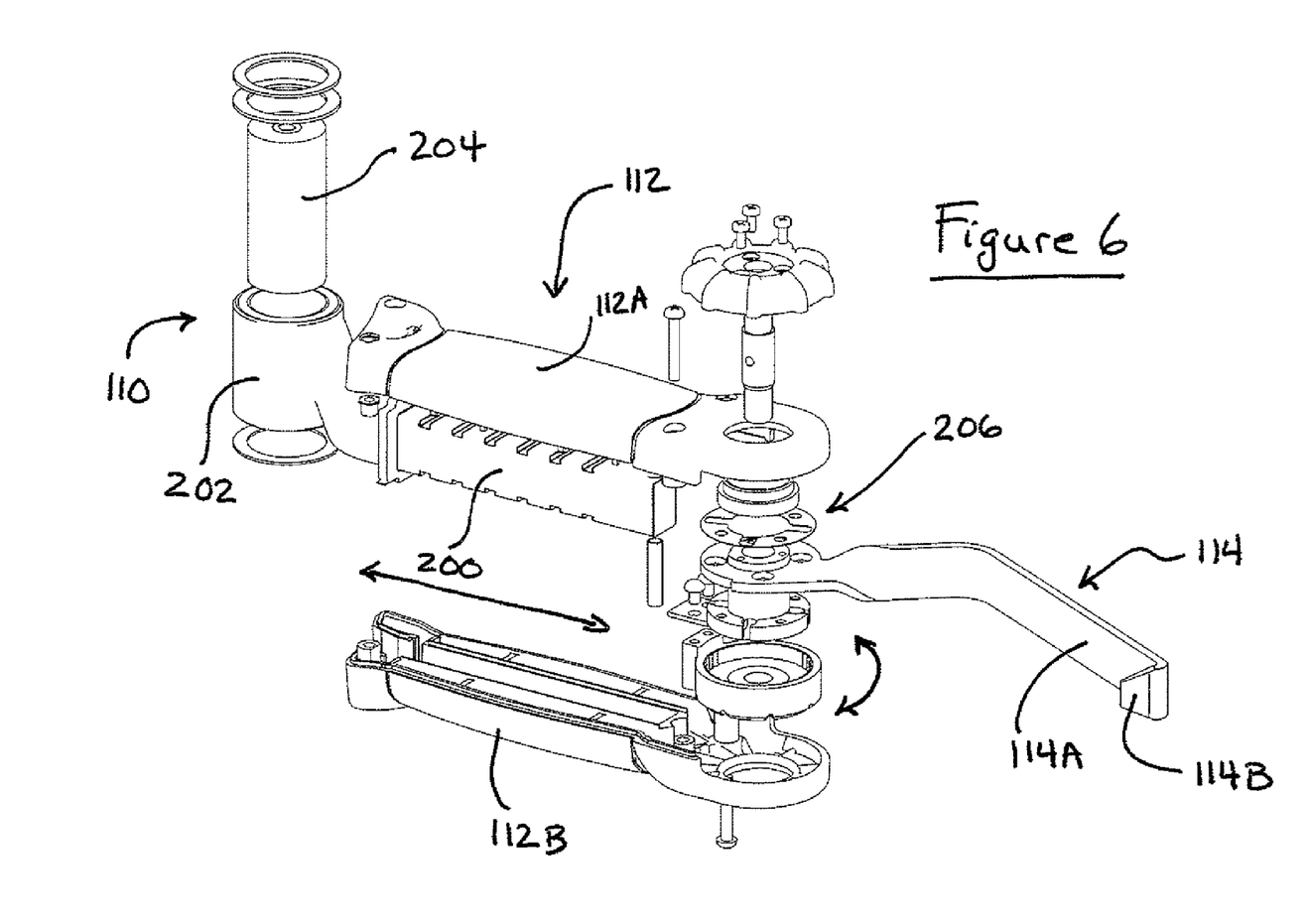
FIG. 6 is an exploded view of a wheel grip handle assembly of the optical target mounting assembly of FIG. 1.

Turning to FIG. 6, a tire hook handle assembly 112 and tire hook 114 are shown in an exploded view which illustrates the various components which enable longitudinal adjustment and rotational adjustment of the tire hook position. The tire hook handle assembly 112 consists generally of a support shaft 200 which is offset from a cylindrical coupling 202 defining the apex 110 of a pivot arm assembly 104. The cylindrical coupling 202, and correspondingly, the support shaft 200, is freely pivotable about an axial stub shaft 204 which is coupled between the upper and lower arms of a pivot arm assembly 104 at the apex 110. The rotational axis about which the support shaft 200 pivots is parallel to the rotational axis for the associated pivot arm assembly 104 between pivot points 110A and 110B. The end of the support shaft 200 opposite from the cylindrical coupling 202 is retained for longitudinal movement within a body of the tire hook handle assembly 112, defined by upper and lower portions 112A and 112B. A conventional pawl mechanism engages detents in the surface of the support shaft 200, enabling a selectable longitudinal adjustment between the support shaft 200 and the body of the tire hook handle assembly 112, lengthening or shortening the tire hook handle assembly 112 as required to engage a vehicle wheel with the tire hook 114.

To further facilitate engagement of a vehicle wheel with the tire hook 114, each tire hook 114 consists of an angled segment 114A terminating in a distal hook 114B. The angled segment 114A is coupled to the body of the tire hook handle assembly by a pivoting coupling 206, opposite from the cylindrical coupling 202. The pivoting coupling 206 enable the tire hook 114 to pivot through an arc about an axis which is parallel to the rotational axis of the cylindrical coupling 202, i.e., in the same plane within which the support shaft 200 moves. Preferably, the pivoting coupling 206 provides a set of predetermined positions to which the tire hook 114 may be pivoted, and provides a suitable locking and release mechanism.

Those of ordinary skill in the art will recognize that any of a variety of mechanical components may be utilized to achieve the desired range of pivoting and longitudinal movement for the tire hooks 114, handle assemblies 112, and pivot arm assemblies 104, including, but not limited to, sliding assemblies, threaded assemblies, pivoting assemblies, and expanding assemblies. It is not required that the hooks, handles or pivot arm assemblies be adjusted synchronously, or that they be disposed in mirror-image configurations, provided the tire hooks 114 are sufficiently positioned to engage the tire tread surfaces of a vehicle wheel to secure the distal end surface 102B of the base assembly 102 against the surfaces of the wheel rim 10 between the circumferential lip and the axial center point, in a stationary and stable manner during wheel alignment angle measurements and procedures.

During use, the optical target assembly 100 is held against the vehicle wheel assembly by forces exerted between the pivot arm assemblies 104A and 104B by the clamping force mechanism 118, which in turn pulls the optical target assembly 100 against the vehicle wheel assembly using the tire hooks 114. The geometry of the entire adapter mechanism transfers the load from the clamping force mechanism to the tire hooks and in turn creates a force pulling the adapter firmly against the face of the wheel.

Figure 7:
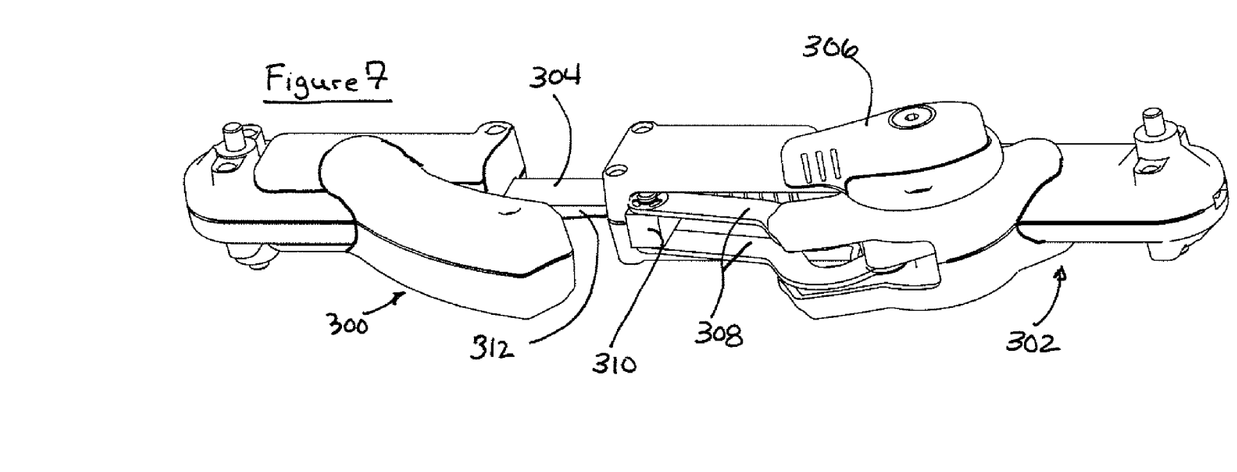
FIG. 7 is a perspective view of the a sectional view of the bar clamp assembly of the optical target mounting assembly of FIG. 1.
Figure 8:
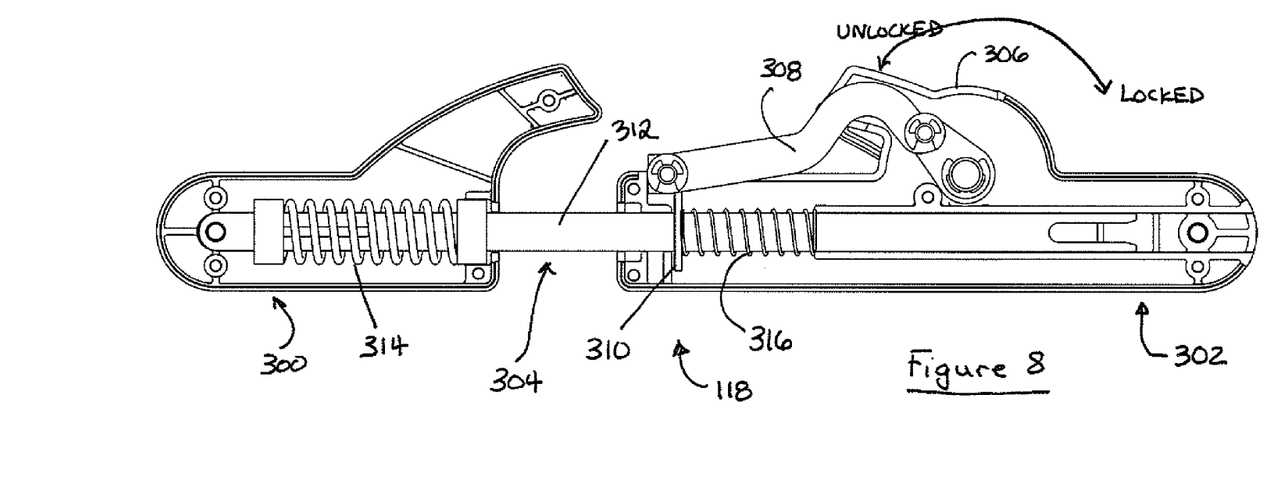
FIG. 8 is a sectional view of the bar clamp assembly of FIG. 7.
Figure 9:
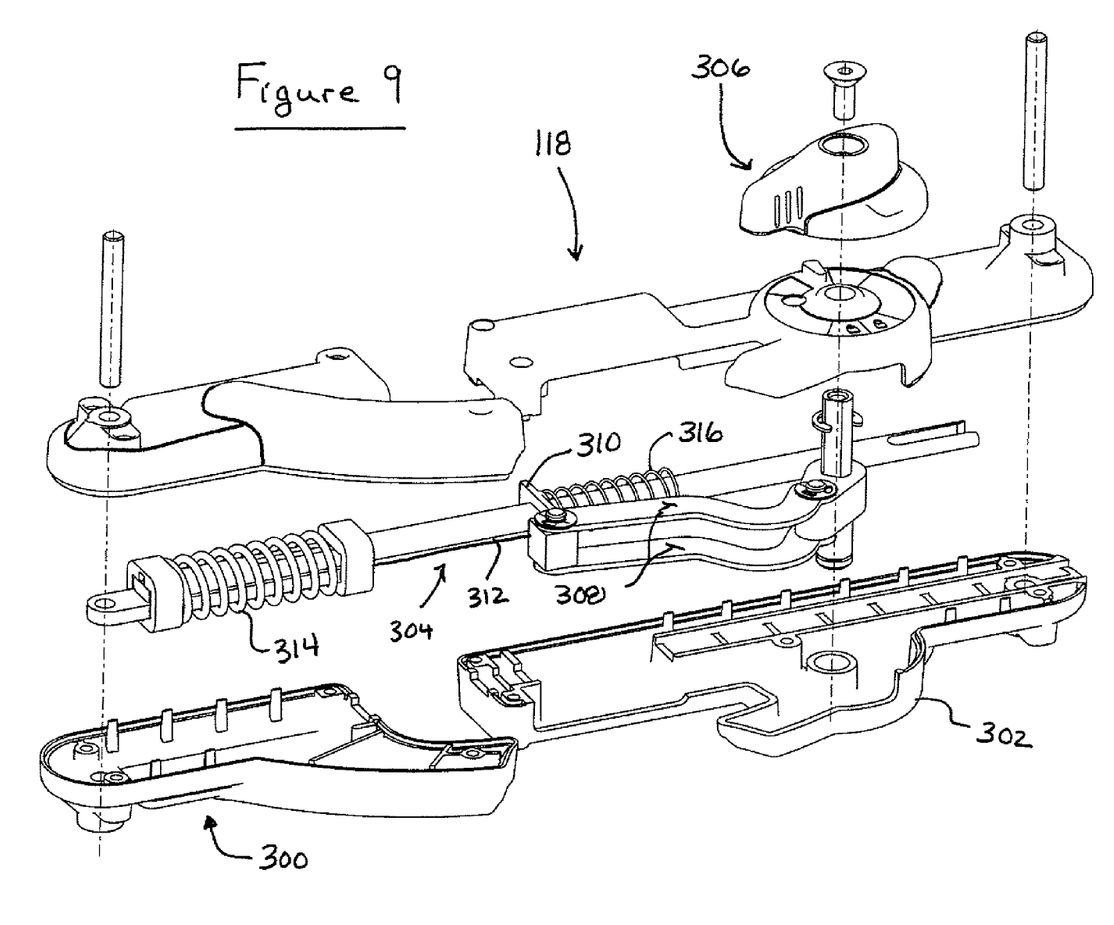
FIG. 9 is an exploded view of the bar clamp assembly of FIG. 7.

Turning to FIGS. 7-9, the clamping force mechanism 118 consists generally of a left end 300 and a right end 302 linked by a spring-biased floating bar and clamp assembly 304. The left end 300 is pivotally coupled to the pivot arm assembly 104B adjacent to associated apex 104X, and the right end 302 is pivotally coupled to the pivot arm assembly 104A adjacent to associated apex 104X, thereby defining a force coupling between each of the pivot arm assemblies 104A and 104B.

The clamping force mechanism 118 is actuated by lever knob 306 of the bar and clamp assembly 304 coupled to the right end 302. The knob 306 rotates a shaft assembly 308 which pulls a pawl 310. The pawl 310 binds onto a bar 312 coupling the left and right ends, and pulls the bar 312 through a set stroke towards the right end 302. The opposite end of the bar is coupled to the left end 300 through a compression spring 314, which is compressed during the stroke movement of the bar 312. With a set spring rate on the compression spring 314, and a set stroke length for binding of the pawl 310, a consistent load is applied between left and right ends each time the knob 306 is rotated from an unlocked to locked position. When the knob 306 is in the unlocked position, as shown in FIGS. 7-9, the pawl 310 slides along the bar 312, and is generally biased towards the unlocked position by a compression spring 316. This allows the pivot arm assemblies 104A and 104B to pivot freely when attaching the optical target assembly 100 to the vehicle wheel assembly 10. The lever knob 306 and associated parts are arranged in a manner that they toggle over center during rotation from the locked to unlocked position. This automatically locks the mechanism when the full load of the high force compression spring 314 is reached. To release the optical target assembly 100 from the vehicle wheel assembly after use, the knob 306 is rotated from the locked position to the unlocked position, releasing the pawl 310 from the bar 312, and relaxing the compression spring 314. With compression spring 314 relaxed, only the tension spring 116 is acting on the pivot arm assemblies 104A and 104B, allowing the operator to uncouple the tire hooks 114 from the vehicle wheel assembly with relative ease.

Those of ordinary skill in the art will recognize that the clamping force mechanism may have a variety of different configurations suitable for exerting forces on the pivot arms and other components of the optical target assembly to achieve the effect of providing a clamping force to hold the optical target assembly securely to a vehicle wheel rim. For example, threaded screw components, or resilient elastic components may be utilized in place of spring-biased mechanisms, and/or the geometric configuration of the various components may be varied to produce different forces and moments which achieve the desired effect of clamping the optical target assembly securely against the vehicle wheel rim surface.

During use, an optical target assembly 100 of the present invention is positioned against a generally vertical outer surface of a vehicle wheel rim 10, such that the visible features of the optical target 108 associated with the target support assembly 106 are orientated for viewing by one or more imaging sensors. The specific placement of the optical target assembly 100 against the outer surface of the wheel rim 10 need not be coaxial with the wheel assembly, i.e., may be eccentric with the vehicle wheel assembly, but must be sufficiently stable to prevent the optical target from tilting, wobbling, or slipping from the initial position during a vehicle service procedure. To maintain the optical target support assembly in a stable position against the wheel rim surface, the pivot arm assemblies 104A and 104B, together with the tire hook handles 112 and tire hooks 114, are adjusted to grip tread surfaces of the vehicle wheel assembly, preferably at or above a horizontal plane through which the wheel axis of rotation AR passes. The interaction of gravity, the geometry of the pivot arm assemblies 104A, 104B, the clamping force mechanism 118, and the distal end surface 102B of the optical target assembly 100 interact to maintain the distal end surface 102B against the wheel rim surface, and to hold the optical target 108 in a stable position during a vehicle service procedure and through a limited range of wheel assembly movement.

Since the optical target 108 disposed on the optical target assembly 100 is not secured to the vehicle wheel assembly in any predetermined position, e.g., concentric with the wheel axis of rotation AR, it is necessary to determine the wheel axis of rotation AR for purposes of calculating vehicle wheel alignment angle measurements from images of the optical targets 108. It is also desirable to compute the wheel assembly center point to further increase accuracy of the alignment measurements. Methods to determine the axis of rotation and center point are described in the co-pending U.S. patent application Ser. No. 11/013,057, herein incorporated by reference.

The present invention can be embodied in part in the form of computer-implemented processes and apparatuses for practicing those processes. The present invention can also be embodied in part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. An optical target assembly adapted to secure an optical target relative to a vehicle wheel assembly consisting of a wheel rim and a tire mounted thereon, comprising:
   a base assembly having a distal end surface configured for non-determined abutting placement against an outer surface of the vehicle wheel assembly between the circumferential lip of the wheel rim and an axial center point of the wheel rim;
   an optical target secured to said base assembly; and
   a pair of pivoting arm assemblies pivotally coupled to said base assembly and supporting tire hooks, said pair of pivoting arm assemblies coupled together via a clamping force mechanism adapted to selectively exert a force on said pair of pivoting arm assemblies to maintain said distal end surface against the outer surface of the wheel assembly during a vehicle service procedure.

2. The optical target assembly of claim 1 wherein distal end surface is displaced from said circumferential lip of the vehicle wheel rim.

3. The optical target assembly of claim 1 wherein said distal end surface is smoothly continuous.

4. The optical target assembly of claim 3 wherein said distal end surface is generally defined by a low amplitude sinusoid, having a multiple of the wavelength equal to a circumference of said base assembly.

5. The optical target assembly of claim 1 wherein said distal end surface is configured to contact the vehicle wheel assembly in at least three discrete points.

6. The optical target assembly of claim 1 wherein said pair of pivoting arm assemblies each pivot independently about a common axis, said common axis parallel to a base plane of said base assembly.

7. The optical target assembly of claim 1 wherein said clamping force mechanism is configured with a compression spring to selectively apply a tension force between said pair of pivoting arm assemblies.

8. The optical target assembly of claim 1 wherein each of said adjustable tire hooks is coupled to an associated pivoting arm assembly via a pivoting tire hook handle assembly, each pivoting tire hook handle assembly coupled to said associated pivoting arm assembly via a pivoting coupling at an opposite end of said arm assembly from said pivotal coupling to said base assembly.

9. The optical target assembly of claim 8 wherein each of said pivoting tire hook handle assemblies is further configured for longitudinal adjustment.

10. The optical target assembly of claim 8 wherein each of said adjustable tire hooks is pivotally coupled to said pivoting tire hook handle assembly; and wherein said adjustable tire hooks, said tire hook handle assemblies, and said pivoting arm assemblies are each configured for pivoting movement in a common plane.

11. The optical target assembly of claim 10 wherein each adjustable tire hook is configured with a locking and release mechanism to secure said adjustable tire hook at a selected rotational position relative to said tire hook handle assembly.

12. The optical target assembly of claim 8 wherein each of said pivoting arm assemblies includes an upper pivoting arm coupled to said base assembly at a first pivot point, a lower pivoting arm coupled to said base assembly at a second pivot point which is diametrically opposite from said first pivot point, and wherein said upper and lower pivot arms in each pivoting arm assembly are coupled together at an apex via an associated tire hook handle assembly.

13. The optical target assembly of claim 1 wherein said base assembly defines an annular member.

14. The optical target assembly of claim 1 wherein said tire hooks are adjustable.

15. An optical target assembly adapted to secure an optical target relative to a vehicle wheel assembly consisting of a wheel rim and a tire mounted thereon, comprising:
   a base assembly having a distal end surface which is smoothly continuous, configured for abutting placement against an outer surface of the vehicle wheel assembly between the circumferential lip of the wheel rim and an axial center point of the wheel rim;
   an optical target secured to said base assembly;
   a pair of pivoting arm assemblies pivotally coupled to said base assembly and supporting adjustable tire hooks, said pair of pivoting arm assemblies coupled together via a clamping force mechanism adapted to selectively exert a force on said pair of pivoting arm assemblies to maintain said distal end surface against the outer surface of the wheel assembly during a vehicle service procedure; and
   wherein said distal end surface includes at least three spaced peaks.

16. An optical target assembly adapted to secure an optical target relative to a vehicle wheel assembly consisting of a wheel rim and a tire mounted thereon, comprising:
   a base assembly having a distal end surface configured for abutting placement against an outer surface of the vehicle wheel assembly between the circumferential lip of the wheel rim and an axial center point of the wheel rim;
   an optical target secured to said base assembly;
   a pair of pivoting arm assemblies pivotally coupled to said base assembly and supporting adjustable tire hooks, said pair of pivoting arm assemblies coupled together via a clamping force mechanism adapted to selectively exert a force on said pair of pivoting arm assemblies to maintain said distal end surface against the outer surface of the wheel assembly during a vehicle service procedure;
   wherein said clamping force mechanism is configured with a compression spring to selectively apply a tension force between said pair of pivoting arm assemblies; and
   wherein said clamping force mechanism includes a spring-biased bar and clamp assembly configured to selectively apply said tension force between said pair of pivoting arm assemblies.

17. The optical target assembly of claim 16 wherein said spring-biased bar and clamp assembly includes a knob, lever, and pawl mechanism configured to lock and unlock a sliding bar coupled between said pair of pivoting arm assemblies by said compression spring, wherein said compression spring exerts said tension force between said pair of pivoting arm assemblies when said sliding bar is locked, and wherein said compression spring is relaxed when sliding bar is unlocked.

18. An optical target assembly adapted to secure an optical target relative to a vehicle wheel assembly consisting of a wheel rim and a tire mounted thereon, comprising:
   a base assembly having a distal end surface configured for non-determined abutting placement against an outer surface of the vehicle wheel assembly;
   an optical target secured to said base assembly; and
   a pair of pivoting arm assemblies coupled to said base assembly and supporting adjustable tire hooks, said pair of pivoting arm assemblies adapted to maintain said distal end surface against the outer surface of the wheel assembly during a vehicle service procedure; and
   wherein each of said adjustable tire hooks is pivotally coupled to an associated pivoting arm assembly via a pivoting connection to a tire hook handle assembly which is, in turn, pivotally coupled to said associated pivoting arm assembly via a pivoting coupling at an opposite end of said arm assembly from said pivotal coupling to said base assembly.

19. The optical target assembly of claim 18 wherein said adjustable tire hooks, said tire hook handle assemblies, and said pivoting arm assemblies are each configured for pivoting movement in a common plane.

20. The optical target assembly of claim 18 wherein said base assembly is configured for non-determined abutting placement against said outer surface of the vehicle wheel assembly between the circumferential lip of the wheel rim and an axial center point of the wheel rim.

21. A method for non-determined mounting of an optical target assembly to a vehicle wheel assembly having a wheel rim and a tire mounted thereon, comprising:
   positioning a base assembly of the optical target assembly against said vehicle wheel assembly with a minimum of three contact points in a non-determined abutting placement against an outer surface of the vehicle wheel assembly between the wheel rim and an axial center point of the wheel rim;
   positioning a first pivoting arm assembly coupled to said base assembly to enable engagement of a tire tread by a first tire tread hook;
   positioning a second pivoting arm assembly coupled to said base assembly to enable engagement of said tire tread by a second tire tread hook; and
   selectively engaging a clamp force mechanism to apply a tension force between said first and second pivoting arm assemblies to exert a force on said tire tread hooks engaged to said tire tread, and to draw said base assembly towards said vehicle wheel rim.

22. The method claim 21 further including the step of pivotally adjusting said first tire tread hook relative to said first pivoting arm assembly to enable engagement of said tire tread; and
   further including the step of pivotally adjusting said second tire tread hook relative to said second pivoting arm assembly to enable engagement of said tire tread.

23. The method of claim 21 wherein said step of positioning includes positioning said base assembly against said vehicle wheel rim with said minimum of three contact points between the circumferential lip of the wheel rim and an axial center point of the wheel rim.

24. An optical target assembly adapted to secure an optical target relative to a vehicle wheel assembly consisting of a wheel rim and a tire mounted thereon, comprising:
   a base assembly;
   an optical target secured to said base assembly; and
   a pair of arm assemblies pivotally coupled to said base assembly and supporting tire hooks, said pair of arm assemblies coupled together via an engaging clamping force mechanism adapted to selectively exert a force on said pair of pivoting arm assemblies to maintain said base assembly in a non-determined abutting placement against the outer surface of the wheel assembly during a vehicle service procedure.

25. The optical target assembly of claim 24 wherein said clamping force mechanism includes a spring-biased floating bar and clamp assembly coupled between said pair of arm assemblies.

26. The optical target assembly of claim 24 wherein said clamping force mechanism is biased by a first spring to consistently apply a first selected load between the pair of arm assemblies in a first position of a clamp assembly, and wherein said clamping force mechanism is biased by a second spring to consistently apply a second selected load between the pair of arm assemblies in a second position of the clamp assembly, said first selected load corresponding to a high clamping force, and said second selected load corresponding to a low clamping force.

27. The optical target assembly of claim 24 wherein said tire hooks are adjustable.

28. An optical target assembly adapted to secure an optical target relative to a vehicle wheel assembly consisting of a wheel rim and a tire mounted thereon, comprising:
   a base assembly having a distal end surface configured for non-determined abutting placement against an outer surface of the vehicle wheel assembly between a circumferential lip of the wheel rim and an axial center point of the wheel rim;
   an optical target secured to said base assembly; and
   a pair of arm assemblies coupled to said base assembly and supporting adjustable tire hooks; and
   wherein each of said adjustable tire hooks is coupled to an associated arm assembly via a pivoting connection.

\* \* \* \* \*